(12) United States Patent
Cros

(10) Patent No.: US 7,980,124 B2
(45) Date of Patent: Jul. 19, 2011

(54) FLUID METER WITH SELF-ORIENTATION OF THE SCREEN AND OF THE OFFICIAL INFORMATION BORNE ON THE COVER

(75) Inventor: Alain Cros, Creches sur Saone (FR)

(73) Assignee: Actaris S.A.S., Boulogne-Billancourt (FR)

( * ) Notice: Subject to any disclaimer, the term of this patent is extended or adjusted under 35 U.S.C. 154(b) by 0 days.

(21) Appl. No.: 12/744,879

(22) PCT Filed: Dec. 2, 2008

(86) PCT No.: PCT/EP2008/066582
§ 371 (c)(1),
(2), (4) Date: Aug. 26, 2010

(87) PCT Pub. No.: WO2009/074482
PCT Pub. Date: Jun. 18, 2009

(65) Prior Publication Data
US 2010/0319449 A1    Dec. 23, 2010

(30) Foreign Application Priority Data

Dec. 11, 2007    (EP) ..................... 07301655

(51) Int. Cl.
*G01F 1/46* (2006.01)
(52) U.S. Cl. ........................................... 73/198
(58) Field of Classification Search ............ 73/275, 73/198
See application file for complete search history.

(56) References Cited

U.S. PATENT DOCUMENTS

| | | | | |
|---|---|---|---|---|
| 4,663,970 A | * | 5/1987 | Sutherland | 73/273 |
| 6,666,083 B2 | * | 12/2003 | Demia | 73/275 |
| 6,853,309 B1 | * | 2/2005 | Schroter | 340/870.02 |

FOREIGN PATENT DOCUMENTS

| DE | 37 27 912 A1 | 3/1989 |
|---|---|---|
| DE | 195 25 685 A1 | 1/1997 |

OTHER PUBLICATIONS

Machine-generated English translation of Abstract for DE3727912 (A1), Mar. 2, 1989.
International Search Report for PCT International Application No. PCT/EP2008/066582 dated Jan. 16, 2009.

* cited by examiner

*Primary Examiner* — Jewel Thompson
(74) *Attorney, Agent, or Firm* — Dority & Manning, P.A.

(57) ABSTRACT

The invention relates to a meter including a counter provided with an electronic display member and covered by a cap (2) presenting at least one window (2A) enabling an electronic screen (3) that is centered on the vertical central axis (X) of the meter to be viewed, said cap (2) carrying official information on its outside face (4). According to the invention, said cap (2) is pivotable about said axis (X) and the meter includes at least one static sensor (5, 6) responsive to pivoting of said cap (2), said sensor controlling the display of said screen (3) in such a manner that the data displayed by the screen has the same reading direction (S1, S2) as said official information (4).

8 Claims, 1 Drawing Sheet

FLUID METER WITH SELF-ORIENTATION OF THE SCREEN AND OF THE OFFICIAL INFORMATION BORNE ON THE COVER

The invention relates to a fluid meter, e.g. a water meter or a heat meter.

Such a meter comprises a vessel having an inlet pipe and an outlet pipe for fluid, a measurement chamber fitted with a measurement member, e.g. a spinner, and installed in the vessel, and an electronic counter and display member, and covered by a cap provided with at least one window enabling a liquid crystal screen to be viewed, which screen may indicate consumption, warnings, or dates. The cap may also include a window giving access to a pushbutton for waking up the screen, and also for turning it off, in order to save energy. The top face of the cap has printed thereon official information such as the manufacturer, technical data, and a serial number.

The relative position between the window corresponding to the screen and the official data is determined during fabrication of the cap of the meter, so as to allow only one viewing direction for reading the screen and the data.

When such a meter is installed in pipework for feeding and delivering water, the arrangement and the disposition of that pipework may be arbitrary, so it can happen that the meter is mounted with its cap so that the screen and the official information is difficult or even impossible to read, e.g. because a wall prevents access to the proper side for reading, so the meter needs to be mounted, so to speak, upside-down relative to the appropriate direction for reading the screen and the official data.

To solve that problem, meters have been made in which the counter, or at least the electronic portion thereof, can be dismantled or pivoted with the cap.

Such a solution is complex and expensive since it is necessary to design and fabricate such an electronic portion that is separable and movable, while nevertheless having cables that pass between said electronic portion and the measurement chamber. Furthermore, the movable connection must be leaktight between the electronic portion and the measurement chamber that is filled with water.

The invention solves this problem by proposing a meter that is particularly simple and inexpensive to fabricate, and that enables the screen and the official information carried by the cap to be oriented automatically so that the screen is easy to read together with the official information, regardless of the position in which the meter is mounted.

To do this, the invention provides a meter including a counter provided with an electronic display member and covered by a cap presenting at least one window enabling an electronic screen that is centered on the vertical central axis of the meter to be viewed, said cap carrying official information on its outside face, the meter being characterized in that said cap is pivotable about said axis and in that the meter includes at least one static sensor responsive to pivoting of said cap, said sensor controlling the display of said screen in such a manner that the data displayed by the screen has the same reading direction as said official information.

In a preferred embodiment, the meter has two sensors located under the cap on the top face of the counter and diametrically opposite about said axis.

Preferably, two reading directions are taken into consideration, said data displayed by the screen being capable of being in a first direction or in an opposite, second direction.

Said sensors may be optical or capacitive sensors, and said cap may include an orifice located in register with one of the sensors when the screen is in register with said window.

When said sensors are capacitive, the cap preferably includes a metal element placed in register with the sensors when the screen is not in register with said window.

Advantageously, said sensors are also buttons for manually actuating the display of said screen.

Said buttons may wake up said screen.

Said sensors may be inductive or capacitive, and the cap may include a metal element located in register with the sensors when the screen is in register with said window.

The invention is described in greater detail below with reference to the figures that show merely preferred embodiments of the invention.

As shown in the figures, a fluid meter, in particular a water meter or a heat meter, comprises a vessel 1 having an inlet pipe 1A and an outlet pipe 1B for fluid, a measurement chamber fitted with a measurement member, e.g. a spinner or components for a static measuring arrangement, and installed in the vessel, and a counter that includes an electronic counting and display member that is covered by a cap 2 having at least one window 2A enabling a liquid crystal screen 3 to be viewed, which screen is centered on the central vertical axis X of the meter and may display consumption, warnings, or dates. On the visible top face of the cap 2, there is printed official information 4 such as the manufacturer, technical data, and a serial number.

The cap 2 is pivotable about the vertical central axis X of the meter, and the meter includes at least one static sensor sensitive to pivoting of the cap 2, the sensor actuating a control for the display on the screen 3 so that the data displayed on the screen is for reading in the same reading direction as the official information 4.

In preferred embodiments, the meter has two sensors located beneath the cap 2 on the top face of the counter at positions that are diametrically opposite about the vertical central axis X of the meter.

Figure 1:
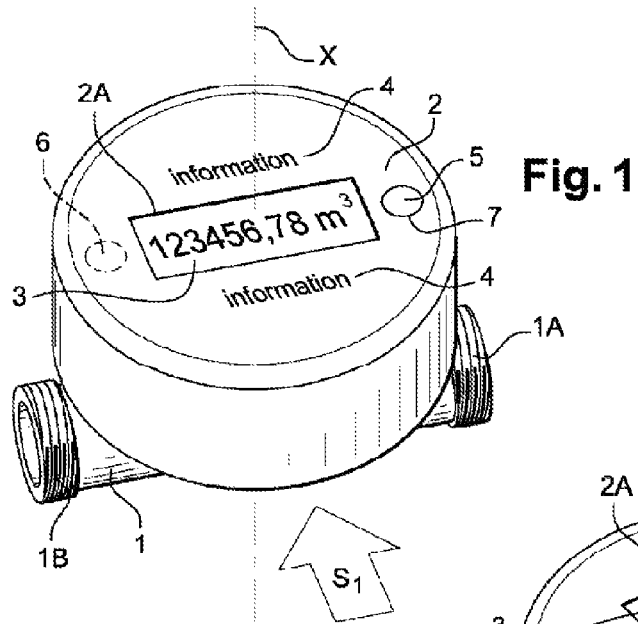
FIG. 1 is a perspective view of a meter in accordance with the invention, in a first position.
Figure 3:
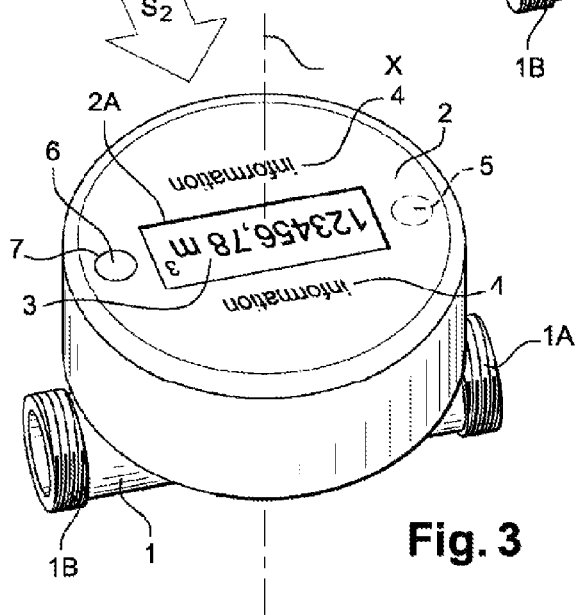
FIG. 3 is a perspective view of the same meter in accordance with the invention, in a second position.

Two reading directions S1 and S2 are considered, the data displayed by the screen 3 being capable of being displayed in a first direction, as shown in FIG. 1, and in an opposite second direction as shown in FIG. 3.

In a first embodiment, the sensors may be optical sensors 5, 6.

The cap then has an orifice 7 located in register with one of the optical sensors when the screen 3 is in register with the window 2A.

As shown in FIG. 1, one of the optical sensors 5 is in register with the orifice 7, while the other sensor 6 lies under the cap 2. The first sensor 5 then controls the display on the screen 3 in such a manner that the data displayed by the screen is in the same reading direction S1 as the official information 4.

Figure 2:
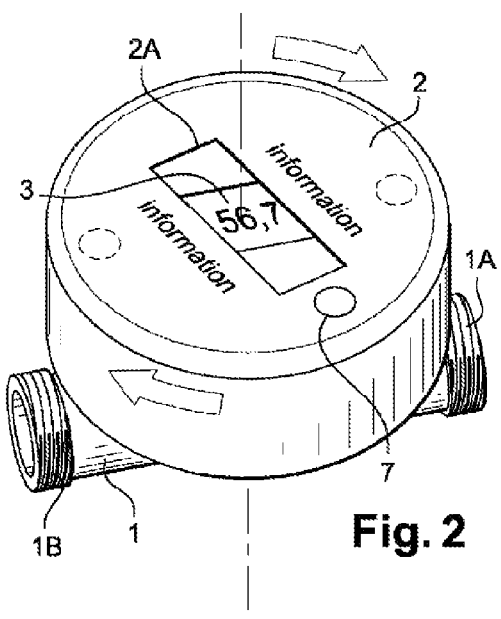
FIG. 2 is a perspective view of the same meter in accordance with the invention, while being adjusted.

If this reading position is not appropriate, because the meter needs to be installed in a position that makes it difficult or impossible to read in said direction S1, then the cap 2 is pivoted, as shown in FIG. 2. Both optical sensors 5 and 6 are then hidden under the cap 2 until the second optical sensor 6 comes into register with the orifice 7, as shown in FIG. 3.

The second sensor 6 then controls the display on the screen 3 so that the data displayed by said screen is turned upside-down so as to be in the same reading direction S2 as the official information 4.

Advantageously, the optical sensors are also buttons for manually actuating the display on the screen 3, thus making it possible, amongst other things, to wake up and possibly also switch off the screen 3.

In a second embodiment, the sensors may be capacitive sensors 5, 6.

The cap then has at least one orifice 7 located in register with one of the capacitive sensors when the screen 3 is in register with the window 2A.

The cap also has a metal element placed in register with the sensors when the screen 3 is not in register with the window 2A. This metal element may be a metal coating on the inside face of the cap 2, at least on the circular path of the sensors.

As shown in FIG. 1, one of the capacitive sensors 5 in register with the orifice 7 is not activated, while the other sensor 6 lying under the cap 2 is activated by the metal coating. The first sensor 5 then controls the display on the screen 3 so that the data displayed by the screen has the same reading direction S1 as the official information 4.

If this reading position is not suitable, because the meter needs to be installed in a position that makes it difficult or impossible to read in the direction S1, then the cap 2 is pivoted, as shown in FIG. 2. Both capacitive sensors 5, 6 are then activated by the metal coating under the cap 2 until the second capacitive sensor 6 is in register with the orifice 7, as shown in FIG. 3.

The second sensor 6 then controls the display on the screen 3 so that the data displayed by the screen is turned upside-down to have the same reading direction S2 as the official information 4.

Advantageously, the capacitive sensors are also buttons for manually actuating the screen 3, thus making it possible, amongst other things, to wake up and possibly also switch off the screen 3.

In a third embodiment, the sensors may be inductive or capacitive sensors 5, 6.

The cap then has a metal element 7 replacing the above-described orifice and located in register with one of the sensors, while the screen 3 is in register with the window 2A.

As shown in FIG. 1, one of the sensors 5 is in register with the metal element 7, and is activated, while the other sensor 6 is under the cap 2 and is inactivated. The first sensor 5 then controls the display on the screen 3 so that the data displayed by said screen is in the same reading direction S1 as the official information 4.

If this reading position is not suitable, e.g. because the meter needs to be installed in a position that makes it difficult or impossible to read in the direction S1, then the cap 2 is pivoted, as shown in FIG. 2. Both sensors 5 and 6 are then de-activated under the cap 2 until the second sensor 6 comes into register with the metal element 7 as shown in FIG. 3.

The second sensor 6 then controls the display on the screen 3 so that the data displayed by said screen is turned upside-down into the same reading direction S2 as the official information 4.

The invention is not limited to the above-described embodiments. Any arrangement of one or more static sensors may be used, whether known or within the competence of the person skilled in the art, for the purpose of controlling the display on the screen 3 so that the data displayed by the screen 3 is for reading in the same direction as the official information 4.

Furthermore, depending on the embodiment described, the cap 2 presents a window 2A that enables an electronic screen 3 centered on the vertical central axis X of the meter to be viewed, which screen is in alignment in both reading directions S1 and S2 with the inlet pipe 1A and the outlet pipe 1B of the vessel, which pipes are in alignment on a common axis.

In a variant, still using the principle of the invention, the screen may be at a non-zero angle relative to said alignment axis of the pipes. For example it may be disposed at an angle of about 45° relative to the alignment axis of the pipes. Such a disposition ensures that it is possible to read the meter ergonomically regardless of whether it is installed in pipe-work that is vertical or horizontal.

The invention claimed is:

1. A meter including a counter provided with an electronic display member and covered by a cap presenting at least one window enabling an electronic screen that is centered on the vertical central axis of the meter to be viewed, said cap carrying official information on its outside face, wherein said cap is pivotable about said axis and the meter includes at least one static sensor responsive to pivoting of said cap, said sensor controlling the display of said screen in such a manner that the data displayed by the screen has the same reading direction as said official information.

2. A meter according to claim 1, wherein two reading directions are taken into consideration, said data displayed by the screen being capable of being in a first direction or in an opposite second direction.

3. A meter according to claim 1, having two sensors located under the cap on the top face of the counter and diametrically opposite about said axis.

4. A meter according to the claim 3, wherein said sensors are optical or capacitive sensors, and said cap includes an orifice located in register with one of the sensors when the screen is in register with said window.

5. A meter according to claim 4, wherein said sensors are capacitive, and the cap includes a metal element placed facing the sensors when the screen is not in register with said window.

6. A meter according to claim 3, wherein said sensors are also buttons for manually actuating the display of said screen.

7. A meter according to claim 6, wherein said buttons wake up said screen.

8. A meter according to claim 3, wherein said sensors are inductive or capacitive, and the cap includes a metal element located in register with the sensors when the screen is in register with said window.

* * * * *